United States Patent Office 3,636,131
Patented Jan. 18, 1972

3,636,131
BASIC DYEABLE POLYESTER
Gerald W. Davis, Gerald Farrow, and Nestor A. Ravenna, Charlotte, N.C., assignors to Fiber Industries, Inc.
No Drawing. Filed Nov. 28, 1969, Ser. No. 880,980
Int. Cl. C08g *17/14*
U.S. Cl. 260—75 S      6 Claims

ABSTRACT OF THE DISCLOSURE

A process for producing basic dyeable polyester fiber and film-forming polymer and the product produced thereby, the process involving incorporating in the polymer minor amounts of a metal salt of isethionic acid and minor amounts of a di-functional compound which copolymerizes with the polymer and functions as a dye opener.

---

This invention relates to film and fiber-forming synthetic polyesters having an affinity for basic dye types. More particularly, this invention relates to polyethylene terephthalate fiber and film-forming polyester having an affinity for basic type dyes without loss of valuable physical properties.

One system for obtaining basic dyeable polyesters is to cause the polyester to contain a sulfonate group in the form of a metallic salt, the sulfonate group being a substituent of a repeating radical and the radical comprising a minor portion of the total polyester. When the sulfonate compounds of the prior art have been aliphatic sulfonate compounds, these compounds have separated the SO₃H group from the polymer chain reactive group by at least three carbon atoms. The three carbon chain length had previously been thought critical inasmuch as the shorter chain length compounds required such heavy additions of sulfonate to the fiber and film-forming polymer as to impair other physical characteristics of the polymer.

It is therefore an object of this invention to produce basic dyeable polyesters by incorporating therein short chain length aliphatic sulfonate salts.

It is an additional object of this invention to provide basic dyeable polyesters having incorporated therein short chain length aliphatic sulfonate salts present in quantities insufficient to impair other physical properties of the polyester polymer.

In accordance with this invention, it has now been discovered that a basic dyeable polyester fiber and film-forming polymer may be produced by incorporating in the polymer, minor amounts of a metal salt of isethionic acid together with minor amounts of a dye opener. The phrase "dye opener" may be defined as a di-functional compound selected from the group consisting of diols and ethers thereof, di-carboxylic acids and esters thereof, mono-hydroxycarboxylic acids and combinations of any of the foregoing compounds. The metal salt of isethionic acid is employed in quantities from about 1% to 8% by weight, and preferably from 2% by weight to 5% by weight. The dye opener is employed in quantities of from 4 mol percent to 20 mol percent.

The metal salt of isethionic acid may be a metal salt wherein the metal is selected from the group consisting of lithium, sodium, potassium and magnesium. It is preferred that the metal be a monovalent metal and most preferably be sodium. The dye opened, dicarboxylic acids and esters thereof which are suitable for the use in this invention are dicarboxylic acids having the following general formula:

$$HO_2C—R—CO_2H$$

where R is a member selected from the group consisting of alkylene, cycloalkylene, arylene and ethers thereof. The specific dicarboxylic acids which have been found to be especially suitable are adipic acid, sebacic acid, dimer acid and isophthalic acid, with adipic acid being the most preferred member. Diols and ethers thereof which are suitable for use in this invention are diols having the following general formula:

$$HO—R—OH$$

where R is a member selected from the group consisting of alkylene, cycloalkylene, arylene and ethers thereof. Preferred among the diols are 1,4-butanediol, while preferred among the polyether diols are diethylene glycol. The specific monohydroxycarboxylic acids which are suitable for use in this invention are:

$$HO—R—CO_2H$$

where R is a member selected from the group consisting of alkylene, cycloalkylene, arylene and ethers thereof. Specific monohydroxycarboxylic acids which are suitable for use in this invention are p-(2-hydroxyethoxy) benzoic acid and ε hydroxy caproic acid.

In general, the process for incorporating the metal salt of isethionic acid into the polyethylene terephthalate may be conducted in conjunction with an ester interchange polyester process such as is set forth in U.S. Pat. No. 2,465,319 or in a direct esterification process such as is set forth in U.S. Pat. No. 3,050,533. While an acceptable product may be produced by adding the salt of isethionic acid and the dye opener at a variety of points during the process, it is preferred that the additions be made after the esterification or ester interchange reaction and prior to complete polymerization of the ester and preferably prior to reaching an intrinsic viscosity of about 0.3 dl./g. Addition of the salt of isethionic acid at this point results in the production of lesser amounts of diethylene glycol. It is preferred that the diethylene glycol content of the polymer be maintained within the range of 3 to 15 mole percent. It is also preferred that the salt of isethionic acid and the dye opener be added simultaneously or in sequence and with small amounts of ethylene glycol such as from about 30 to 70 percent by weight of ethylene glycol based on the total weight of the reaction batch, in order to achieve a more homogenous dispersion.

Various other materials may be present in the reaction mixture. For example, such ester interchange catalysts as salts of manganese, cobalt, zinc, and the like and such polymerization catalysts as antimony trioxide, antimonic acid, germanium dioxide, stannous oxalate, organotitanium compounds and the like usually will be present. Color inhibitors such as alkyl or aryl phosphate esters, alkyl or aryl phosphite esters, and the like may be used. In addition, pigments, delustrants such as titanium dioxide and other additives may be present, although the absence of delustrants is more desirable.

The yarns or filaments in continuous or staple form produced in accordance with the present invention are suitable for the usual textile applications. They may be employed in the knitting or weaving of all types as well as in the production of non-woven felt-like products by known methods. The physical properties of the modified yarns or filaments are sufficiently close to those of their related non-modified polyester fibers. The modified yarns or filaments differ, however, in that they have a particular sensitivity toward basic dyes. By a "basic dye" is meant a colored cationic organic substance such as those containing sulfonium, oxonium or quaternary ammonium functional groups. Among the basic types which may be applied either to the filaments in continuous or staple form obtained in accordance with the present invention or to fabrics prepared therefrom may be mentioned Victoria Green WB (C.I. Basic Green 4), a dye of the triphenylmethane type having the following chemical structure:

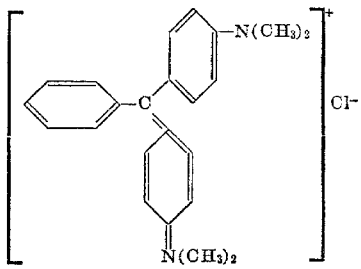

Victoria Pure Blue BO (C.I. Basic Blue 7), a triarylmethane type dye having the following chemical structure:

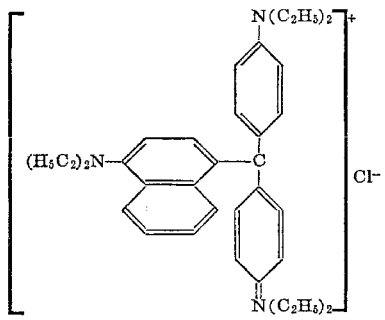

Sevron Blue 5G (C.I. Basic Blue 4), a dye of the oxazine type having the following chemical structure:

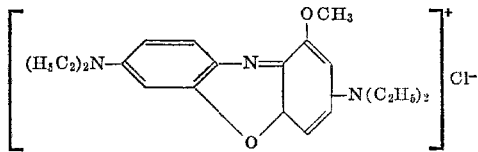

Brilliant Green B (C.I. Basic Green 1), a triphenylmethane type dye having the following chemical structure:

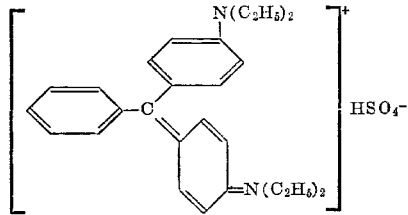

and Rhodamine B (C.I. Basic Violet 10), a dye of the xanthene type having the following chemical structure:

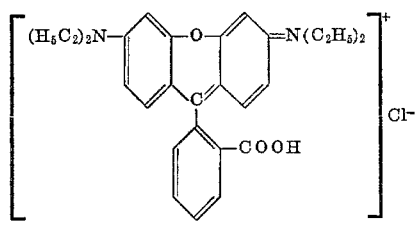

and the like. The dyes are preferably applied from an aqueous solution at a temperature between 80° C. and 125° C.

Filaments and films, i.e., shaped structures which have at least one dimension relatively very small and at least one dimension relatively large, are the preferred structures of the present invention. Such structures of the polyester compositions of this invention are permeated uniformly throughout by basic dyes applied from hot aqueous solution. The penetration of dyes is an important characteristic since poor resistance to fading and loss of color through rubbing or abrasion is a known characteristic of structures which retain dye only at their surfaces.

The following specific examples are given for purposes of illustration and should not be considered as limiting the spirit or scope of this invention.

EXAMPLE I

A jacketed, steam-heated autoclave, fitted with an agitator and a packed distillation column with condenser, is charged with 2200 parts of dimethyl terephthalate, 1584 parts of ethylene glycol and 0.48 part of zinc acetate. Over a period of about 200 minutes the mixture is heated to about 220° C. and methanol distilled; at the end of this time methanol distillation is complete. The autoclave then is charged with 3.6 parts of a 50% ethylene glycol solution of trimethylphosphite. After approximately 5 minutes, the autoclave is charged with 109 parts of adipic acid and 84 parts of sodium isethionate, both dissolved in 180 parts of ethylene glycol at 130° C., and 0.73 parts of antimony trioxide. The resultant mixture then is transferred to a second jacketed autoclave, heated by means of a Dowtherm system (heat transfer medium manufactured by Dow Chemical Company, Midland, Mich.) and fitted with an agitator, condenser, and means for operating the autoclave under reduced pressure. The mixture is polymerized over a period of about 230 minutes under gradually decreasing pressure (to less than about 2.0 millimeters mercury) and at a maximum polymerization temperature of 280° C. The resultant polymer is extruded and has an intrinsic viscosity of 0.55 deciliter per gram.

As used herein, intrinsic viscosity is a measure of the degree of polymerization of the polyester and may be defined as:

$$\text{Limit } \frac{(\eta - \eta^0)}{\eta^0 C} \text{ as C approaches zero}$$

where $\eta$ is the viscosity of a dilute solution of the polyester in ortho-chlorophenol solvent, $\eta^0$ is the viscosity of the pure solvent measured in the same units and at the same temperature as $\eta$, and C is the concentration in grams of polyester per 100 milliliters of solvent. Thus, intrinsic viscosity has the units, deciliters per gram.

The polymer of Example I is spun and drawn to give 13.0 denier per filament x 6 inch staple fiber (spun denier is 4220) having a tenacity of 2.40 grams per denier, an elongation of 52.1 percent, 10.4 crimps per inch, and 2.5 percent crimp. The staple is dyed with Sevron Blue 5G (C.I. Basic Blue 4) to a medium shade of blue having good lightfastness properties.

Unless otherwise stated, all dyeings described herein use the following procedure: The scoured fiber is added to water (60:1 liquor ratio) containing 3 grams per liter of diphenyl and 10 percent (on the weight of fiber) of sodium sulfate decahydrate. The bath is heated at about 70° C. for about 10 minutes and 2 percent (on the weight of fiber) of Sevron Blue 5G added. The bath is boiled for 90 minutes. The rinsed fiber then is scoured, rinsed, and dried.

As a control, poly(ethylene terephthalate) is prepared as described above except that the ethylene glycol solution of sodium isethionate and adipic acid is not added. The resultant polymer has an intrinsic viscosity of 0.61 deciliters per gram. The polymer is spun and drawn to give 13.0 denier per filament x 6 inch staple having a tenacity of 3.8 grams per denier and an elongation of 50 percent and otherwise similar to the staple from the polymer of Example I. The control fiber when dyed with Sevron Blue 5G absorbs none of the dye.

EXAMPLE II

An ester-interchange vessel is charged with 88 gallons of ethylene glycol, preheated to 150° C., followed by a 2000 pound charge of dimethyl terephthalate also preheated to 150° C. 0.48 pound of zinc acetate is then added and the batch heated with methanol being taken off. After the batch temperature reaches 200° C., the distillate flow is switched to a glycol receiver. Approximately 20 minutes before the completion of methanol take-off, an additive melter is charged with 30 gallons of ethylene glycol and heated to 250° C. One hundred pounds of adipic acid is then added to the additive melter. When the batch temperature is at 225° C., the adipic acid-glycol melt which is maintained at 125° C. is added to the ester interchange batch. After the adipic acid-glycol melt charge has been completed, the ester interchange vessel is placed on glycol take-off for about 30 minutes. An additive melter is charged with 30 gallons of ethylene glycol and heated to 125° C. Sixty pounds of sodium isethionate is then charged into the same additive melter and heated to 125° C. The full additive charge is then added to the ester interchange vessel, and the composite transferred to an autoclave. A vacuum is then applied to the autoclave and the batch temperature controlled at 280° C. The resulting polymer is found to have an intrinsic viscosity of 0.55, a melting point of 232° C. and is spun and drawn to give 13.0 denier per filament x 6 inch staple which is found to have a tenacity of 2.3 grams per denier, and elongation at the break of 55%. When dyed with Sevron Blue 5G, the product is found to dye to a medium shade of blue having good lightfastness properties.

EXAMPLE III

The procedure of Example II is repeated with the exception that the sodium salt of isethionic acid is added as a dry charge to the ester interchange vessel; that is to say, the sodium salt of isethionic acid is added without being mixed with ethylene glycol. The end product is found to be similar in all respects to that of Example II, with the exception that the dye uniformity is not quite as even as that of Example II.

EXAMPLE IV

In a manner similar to that of Example I, a mixture of 2160 parts of dimethyl terephthalate, 1560 parts of ethylene glycol, and 0.76 part of zinc acetate is heated to about 220° C. over a period of about 210 minutes; methanol is distilled. To the mixture then are added an ethylene glycol solution of 75 parts of sodium isethionate, 2.24 parts of a 50 percent ethylene glycol solution of trimethylphosphite, 10.4 parts of titanium dioxide, and 1.52 parts of antimony trioxide. The mixture is polymerized over a period of about 120 minutes under gradually decreasing pressure (to less than about 3.0 millimeters mercury) and at a maximum polymerization temperature of 284° C. The resultant polymer is extruded and has an intrinsic viscosity of 0.56 deciliter per gram.

Spinning and drawing of the polymer, which contains no dye opener, is carried out only with extreme difficulty and the resultant fiber is found to dye to only a very light shade of blue with Sevron Blue 5G.

EXAMPLE V

In a manner similar to that of Example I, a mixture of 2400 parts of dimethyl terephthalate, 1760 parts of ethylene glycol, and 0.84 part of zinc acetate is heated to about 220° C. and methanol is distilled. The autoclave is charged with 2.0 parts of a 50 percent ethylene glycol solution of trimethylphosphite and the resultant mixture stirred for 10 minutes. The autoclave then is charged with 144 parts of adipic acid and the mixture refluxed for 30 minutes, followed by distillation under reduced pressure of the water produced. To the mixture then are added 1.2 parts of antimony trioxide, 8.4 parts of titanium dioxide, and 74 parts of lithium isethionate. The resultant mixture is polymerized over a period of about 120 minutes under gradually decreasing pressure (to less than about 1.0 millimeter mercury) and at a maximum polymerization temperature of 260° C. The extruded polymer has an intrinsic viscosity of 0.52 deciliter per gram. The polymer is converted to 70 denier, 36 filament yarn and dyed as in Example I and is found to exhibit similar results.

EXAMPLE VI

The experiment of Example V was repeated, except that the lithium isethionate was replaced with 84 parts of magnesium isethionate. Results similar to those of Example V were obtained.

EXAMPLE VII

In a manner similar to that of Example IV, a mixture of 2160 parts of dimethyl terephthalate, 1560 parts of ethylene glycol, and 0.76 part of zinc acetate is heated to about 220° C. over a period of about 210 minutes; methanol is distilled. The autoclave is charged with 192 parts of isophthalic acid dissolved in 224 parts of ethylene glycol at 160° C. The resultant mixture is refluxed for 60 minutes. The autoclave then is charged with 0.96 part of a 50% ethylene glycol solution of trimethylphosphite, 0.96 part of antimony trioxide and 8.40 parts of titanium dioxide. Polymerization of the mixture under gradually decreasing pressure (to less than about 1.0 millimeters mercury) then is initiated. After about 140 minutes the autoclave is opened after releasing vacuum and charged with 84 parts of sodium isethionate dissolved in 224 parts of ethylene glycol at 160° C. Polymerization under reduced pressure (less than about 2.0 millimeters mercury) is resumed and continued for an additional 105 minutes at a maximum polymerization temperature of 297° C. The polymer is extruded and converted to 180 denier, 36 filament which is found to dye with Sevron Blue 5G to a medium blue.

The basic dyeable fiber and film-forming polyethylene terephthalate of this invention contains the dye opener in the form of a copolymer while the salt of isethionic acid is at least 50% reacted with the polymer. While the exact mechanism of the reaction between the salt of isethionic acid and the polymer is unknown, the degree of reactivity may be deduced from the fact that not more than 50% of the salt of isethionic acid may be extracted with boiling water. The measurement is made by determining percent sulfur in the polymer before water extraction and after subjecting the sample to heating in water at the boil for 1¾ hours, the sample being rinsed and dried before the second sulfur determination is made.

Having thus disclosed the invention, what is claimed is:

1. In a process for preparing basic dyeable poly(ethylene terephthalate) comprising the steps of reacting ethylene glycol with terephthalic acid or the dimethyl ester thereof and thereafter polymerizing the ester so formed, the improvement which comprises adding to the reaction mixture prior to the time the reaction mixture has an intrinsic viscosity of about 0.3 deciliters/gram (a) from about 1 to about 8 percent (by weight) of a salt of isethionic acid selected from the group consisting of lithium isethionate, sodium isethionate, potassium isethionate, and magnesium isethionate and (b) from about 4 to about 20 mol percent of a difunctional dye opener selected from the group consisting of dicarboxylic acids, dicarboxylic acid esters, diols, diolethers, monohydroxycarboxylic acids, monohydroxycarboxylic acid esters, and combinations thereof.

2. The process of claim 1, wherein said dye opener is selected from the group consisting of adipic acid, sebacic acid, dimer acid, isophthalic acid, 1,4-butanediol, diethylene glycol, p-(2-hydroxyethoxy) benzoic acid, and ε-hydroxy caproic acid.

3. The process of claim 2, wherein from about 2 to about 5 percent (by weight) of the sodium salt of isethionic acid and from about 4 to about 20 mol percent of adipic acid are added to said reaction mixture prior to the time it has an intrinsic viscosity of about 0.3 deciliters/gram.

4. A basic dyeable fiber and film forming poly(ethylene terephthalate) prepared by the process of claim 1.

5. The basic dyeable fiber and film forming poly-(ethylene terephthalate) of claim 4, wherein said dye opener is selected from the group consisting of adipic acid, sebacic acid, dimer acid, isophthalic acid, 1,4-butanediol, diethylene glycol, p-(2-hydroxyethoxy) benzoic acid, and ε-hydroxy caproic acid.

6. The basic dyeable fiber and film forming poly(ethylene terephthalate) of claim 5, wherein from about 2 to about 5 percent (by weight) of the sodium salt of isethionic acid and from about 4 to about 20 mol percent of adipic acid are added to said reaction mixture prior to the time it has an intrinsic viscosity of about 0.3 deciliters/gram.

References Cited

UNITED STATES PATENTS

| | | | |
|---|---|---|---|
| 3,112,159 | 11/1963 | Cappuccio et al. | 8—173 X |
| 3,310,532 | 3/1967 | Kazama et al. | 260—75 |
| 3,402,014 | 9/1968 | Ucci | 8—173 X |
| 3,432,472 | 3/1969 | Caldwell | 260—75 |

OTHER REFERENCES

A. M. Schwartz and J. W. Perry, Surface Active Agents, vol. I, Libr. Call No. TP149S3, Interscience Publishers, Inc., New York (1949), pp. 94–5.

MORRIS LIEBMAN, Primary Examiner

S. M. PERSON, Assistant Examiner

U.S. Cl. X.R.

260—40P